(12) United States Patent
Boothroyd et al.

(10) Patent No.: US 10,623,352 B2
(45) Date of Patent: *Apr. 14, 2020

(54) MODIFICATION OF ELECTRONIC MESSAGES

(71) Applicant: International Business Machines Corporation, Armonk, NY (US)

(72) Inventors: Richard Boothroyd, Cambridge (GB); Robert L. Kerr, Cambridge (GB); Michael P. Kirwan, Cambridge (GB); Kevin J. Sayer, Cambridge (GB)

(73) Assignee: International Business Machines Corporation, Armonk, NY (US)

( * ) Notice: Subject to any disclaimer, the term of this patent is extended or adjusted under 35 U.S.C. 154(b) by 510 days.

This patent is subject to a terminal disclaimer.

(21) Appl. No.: 14/672,457

(22) Filed: Mar. 30, 2015

(65) Prior Publication Data
US 2016/0294745 A1 Oct. 6, 2016

(51) Int. Cl.
| | | |
|---|---|---|
| *G06F 15/16* | (2006.01) | |
| *H04L 12/58* | (2006.01) | |
| *H04L 29/08* | (2006.01) | |
| *H04W 4/21* | (2018.01) | |
| *H04W 4/18* | (2009.01) | |

(52) U.S. Cl.
CPC ............ *H04L 51/063* (2013.01); *H04L 51/38* (2013.01); *H04L 67/306* (2013.01); *H04W 4/18* (2013.01); *H04W 4/21* (2018.02); *H04L 51/02* (2013.01)

(58) Field of Classification Search
CPC ......... H04L 51/00; H04L 51/063; H04W 4/18
USPC ......................................................... 709/206
See application file for complete search history.

(56) References Cited

U.S. PATENT DOCUMENTS

| | | | | |
|---|---|---|---|---|
| 7,529,804 B1 * | 5/2009 | Lu | .......... | G06Q 10/107 709/206 |
| 7,890,860 B1 * | 2/2011 | Thrasher | ............... | G06F 17/274 707/E17.094 |
| 7,921,013 B1 | 4/2011 | Ostermann et al. | | |
| 8,015,250 B2 | 9/2011 | Kay | | |
| 8,396,820 B1 | 3/2013 | Rennie | | |
| 8,769,020 B2 | 7/2014 | Petry et al. | | |
| 8,838,438 B2 | 9/2014 | Leary et al. | | |

(Continued)

OTHER PUBLICATIONS

B. L. Tseng, Ching-Yung Lin and J. R. Smith, "Using MPEG-7 and MPEG-21 for personalizing video," in IEEE MultiMedia, vol. 11, No. 1, pp. 42-52, Jan.-Mar. 2004 (Year: 2004).*

(Continued)

*Primary Examiner* — Oscar A Louie
*Assistant Examiner* — Messeret F Gebre
(74) *Attorney, Agent, or Firm* — Jordan T. Schiller

(57) ABSTRACT

Modification of electronic messages is provided. A content of an electronic message having one or more recipients is analyzed. One or more suggested modifications to the content of the electronic message are provided, based, at least in part, on the content of the electronic message and on at least one of: recipient profile data of the one or more recipients and group data of the one or more recipients. The content of the electronic message is modified based, at least in part, on a selected suggested modification of the one or more suggested modifications in response to receiving an interaction of a user, wherein the interaction identifies the selected suggested modification.

13 Claims, 9 Drawing Sheets

(56) References Cited

U.S. PATENT DOCUMENTS

| | | | |
|---|---|---|---|
| 8,918,466 | B2 | 12/2014 | Yu |
| 9,092,742 | B1* | 7/2015 | Zeng .................... G06K 9/6256 |
| 2010/0082751 | A1 | 4/2010 | Meijer et al. |
| 2010/0223341 | A1* | 9/2010 | Manolescu ............. H04L 51/32 709/206 |
| 2010/0223581 | A1 | 9/2010 | Manolescu et al. |
| 2010/0293057 | A1 | 11/2010 | Haveliwala et al. |
| 2012/0245924 | A1* | 9/2012 | Brun .................... G06F 17/2765 704/9 |
| 2013/0191212 | A1 | 7/2013 | Shepherd et al. |
| 2013/0346067 | A1 | 12/2013 | Bhatt |
| 2014/0214409 | A1 | 7/2014 | Leydon |
| 2016/0267533 | A1* | 9/2016 | Seth .................... G06Q 30/0255 |
| 2016/0294746 | A1 | 10/2016 | Boothroyd et al. |

OTHER PUBLICATIONS

M. Jayaratne, I. Haththotuwa, C. D. Arachchi, S. Perera, D. Fernando and S. Weerakoon, "iSeS: Intelligent semantic search framework," 2012 6th Euro American Conference on Telematics and Information Systems (EATIS), Valencia, 2012, pp. 1-8. (Year: 2012).*

Yan Chen, "Extracting concepts' relations and users' preferences for personalizing query disambiguation", International Journal on Semantic Web and Information Systems, pp. 65-79, 2009. (Year: 2009).*

R. Zgheib, G. Fleury and E. Lahalle, "New Fast Algorithm for Simultaneous Identification and Optimal Reconstruction of Non Stationary AR Processes with Missing Observations," 2006 , WY, 2006, pp. 371-337 (Year: 2006).*

Ayodele, S. Zhou and R. Khusainov, "Email Grouping and Summarization: An Unsupervised Learning Technique," 2009 WRI World Congress on Computer Science and Information Engineering, Los Angeles, CA, 2009, pp. (Year: 2009).*

J. Wang, T. Herath, R. Chen, A. Vishwanath and H. R. Rao, "Research Article Phishing Susceptibility: An Investigation Into the Processing of a Targeted Spear Phishing Email," in IEEE Transactions on Professional Communication, vol. 55, No. 4, pp. 345-362, Dec. 2012 (Year: 2012).*

Bollegala et al., "Using Multiple Sources to Construct a Sentiment Sensitive Thesaurus for Cross-Domain Sentiment Classification", Proceedings of the 49th Annual Meeting of the Association for Computational Linguistics, pp. 132-141, Portland, Oregon, Jun. 19-24, 2011. ©2011 Association for Computational Linguistics.

Skovholt et al., "The Communicative Functions of Emoticons in Workplace E-Mails: :-)*", Journal of Computer-Mediated Communication 19 (2014) 780-797 © 2014 International Communication Association.

U.S. Appl. No. 15/077,961, entitled "Modification of Electronic Messages", filed Mar. 23, 2016.

Appendix P, List of IBM Patents or Patent Applications Treated As Related.

* cited by examiner

| Synonym Group | Tones | | | | |
|---|---|---|---|---|---|
| | Formal | Informal | Friendly | Direct | Jokey |
| 1 Complaint | ✓ | | | ✓ | |
| Protest | ✓ | | | ✓ | |
| Objection | ✓ | | | ✓ | |
| Grievance | ✓ | | | | |
| Charge | ✓ | | | | |
| Accusation | ✓ | | | | |
| Criticism | ✓ | | | | |
| Cavil | | ✓ | | | |
| Quibble | | ✓ | ✓ | | ✓ |
| Grumble | | ✓ | | | |
| Moan | | ✓ | | | |
| Whine | | ✓ | | | |
| Beef | | ✓ | ✓ | | |
| Gripe | | ✓ | | | |
| Grouse | | ✓ | | | |
| Grouch | | ✓ | | | |
| Whinge | | ✓ | | | |
| Plaint | | ✓ | | | |
| 2 Staff | ✓ | | | | |
| Employees | ✓ | | | | |
| Workers | ✓ | | | | |
| Personnel | ✓ | | | | |
| Hands | | ✓ | | | |
| Hired hands | | ✓ | ✓ | | |
| Labourers | ✓ | | | | |
| Manpower | ✓ | | | | |
| Liveware | | ✓ | ✓ | | ✓ |

FIG. 3

| Audience Segment 1 | | | |
|---|---|---|---|
| Tone | Open Rate | Click Rate | Conversion Rate |
| Friendly | 22% | 6% | 2% |
| Direct | 25% | 8% | 7% |
| Literal | 23% | 3% | 5% |
| Formal | 25% | 8% | 7% |
| Jokey | 20% | 1% | 0% |

FIG. 6A

| Audience Segment 2 | | | |
|---|---|---|---|
| Tone | Open Rate | Click Rate | Conversion Rate |
| Friendly | 18% | 4% | 1% |
| Direct | 22% | 5% | 1% |
| Literal | 27% | 7% | 3% |
| Formal | 17% | 2% | 0% |
| Jokey | 16% | 3% | 1% |

FIG. 6B

| Audience Segment 1 | | | |
|---|---|---|---|
| Typeface | Open Rate | Click Rate | Conversion Rate |
| Calibri | 30% | 10% | 6% |
| Arial | 25% | 7% | 2% |
| Bookman | 14% | 3% | 1% |
| Palatino | 18% | 8% | 4% |
| Dotum | 20% | 5% | 3% |
| Broadway | 23% | 4% | 1% |

FIG. 7A

| Audience Segment 2 | | | |
|---|---|---|---|
| Typeface | Open Rate | Click Rate | Conversion Rate |
| Calibri | 22% | 6% | 2% |
| Arial | 26% | 8% | 4% |
| Bookman | 10% | 4% | 1% |
| Palatino | 15% | 3% | 0% |
| Dotum | 20% | 5% | 2% |
| Broadway | 10% | 2% | 0% |

FIG. 7B

| Audience Segment 1 | | | |
|---|---|---|---|
| Time of Day Sent | Open Rate | Click Rate | Conversion Rate |
| 12:01 AM - 4 AM | 5% | 1% | 0% |
| 4:01 AM - 8 AM | 25% | 8% | 4% |
| 8:01 AM - 12 PM | 18% | 5% | 2% |
| 12:01 PM - 4 PM | 10% | 3% | 0% |
| 4:01 PM - 8 PM | 20% | 9% | 3% |
| 8:01 PM - 12 AM | 7% | 2% | 1% |

FIG. 8A

| Audience Segment 2 | | | |
|---|---|---|---|
| Time of Day Sent | Open Rate | Click Rate | Conversion Rate |
| 12:01 AM - 4 AM | 10% | 3% | 1% |
| 4:01 AM - 8 AM | 16% | 4% | 1% |
| 8:01 AM - 12 PM | 20% | 6% | 2% |
| 12:01 PM - 4 PM | 25% | 9% | 5% |
| 4:01 PM - 8 PM | 5% | 1% | 0% |
| 8:01 PM - 12 AM | 4% | 2% | 1% |

FIG. 8B

MODIFICATION OF ELECTRONIC MESSAGES

BACKGROUND OF THE INVENTION

The present invention relates generally to the field of communication analytics, and more particularly to analytical modification of electronic messages.

Electronic communication is arguably the most prevalent form of communication amongst human beings. Communication via electronic messages (e.g., emails, text messages, social network electronic communications, and short message service (SMS) messages) can be accomplished quickly, inexpensively, and on a massive scale compared to many non-electronic modes of communication. Electronic messages are often used in commerce. For example, business-to-business and business-to-consumer communications can involve electronic messages being sent to millions of diverse clients. Normally, a commerce-driven electronic message is sent for the purpose of generating revenue for the sender by, for example, soliciting for the sale of goods and/or services. Thus, the message needs to encourage action from the recipient in order to generate revenue and be successful.

SUMMARY

According to one embodiment of the present invention, a method for modification of electronic messages is provided. The method includes: analyzing, by one or more processors, a content of an electronic message having one or more recipients; providing, by one or more processors, one or more suggested modifications to the content of the electronic message based, at least in part, on the content of the electronic message and on at least one of: recipient profile data of the one or more recipients and group data of the one or more recipients; and modifying, by one or more processors, the content of the electronic message based, at least in part, on a selected suggested modification of the one or more suggested modifications in response to receiving, by one or more processors, an interaction of a user, wherein the interaction identifies the selected suggested modification.

According to another embodiment of the present invention, a computer program product for modification of electronic messages is provided. The computer program product comprises a computer readable storage medium and program instructions stored on the computer readable storage medium. The program instructions include: program instructions to analyze a content of an electronic message having one or more recipients; program instructions to provide one or more suggested modifications to the content of the electronic message based, at least in part, on the content of the electronic message and on at least one of: recipient profile data of the one or more recipients and group data of the one or more recipients; and program instructions to modify the content of the electronic message based, at least in part, on a selected suggested modification of the one or more suggested modifications in response to receiving an interaction of a user, wherein the interaction identifies the selected suggested modification.

According to another embodiment of the present invention, a computer system for modification of electronic messages is provided. The computer system includes one or more computer processors, one or more computer readable storage media, and program instructions stored on the computer readable storage media for execution by at least one of the one or more processors. The program instructions include: program instructions to analyze a content of an electronic message having one or more recipients; program instructions to provide one or more suggested modifications to the content of the electronic message based, at least in part, on the content of the electronic message and on at least one of: recipient profile data of the one or more recipients and group data of the one or more recipients; and program instructions to modify the content of the electronic message based, at least in part, on a selected suggested modification of the one or more suggested modifications in response to receiving an interaction of a user, wherein the interaction identifies the selected suggested modification.

BRIEF DESCRIPTION OF THE DRAWINGS

FIG. 3 is a portion of a table illustrating the characterization of synonym groups by conversational tones, in accordance with an embodiment of the present invention.

FIG. 6A is a table of example data acquired by the modification program that shows the effect of conversational tones on electronic message success rates for a first audience segment, in accordance with an embodiment of the present invention.

FIG. 6B is a table of example data acquired by the modification program that shows the effect of conversational tones on electronic message success rates for a second audience segment, in accordance with an embodiment of the present invention.

FIG. 7A is a table of example data acquired by the modification program that shows the effect of formatting on electronic message success rates for a first audience segment, in accordance with an embodiment of the present invention.

FIG. 7B is a table of example data acquired by the modification program that shows the effect of formatting on electronic message success rates for a second audience segment, in accordance with an embodiment of the present invention.

FIG. 8A is a table of example data acquired by the modification program that shows the effect of time of sending on electronic message success rates for a first audience segment, in accordance with an embodiment of the present invention.

FIG. 8B is a table of example data acquired by the modification program that shows the effect of time of sending on electronic message success rates for a second audience segment, in accordance with an embodiment of the present invention.

DETAILED DESCRIPTION

Embodiments of the present invention recognize that electronic messages are often created to generate business for the senders or to solicit a response. For example, a recipient must open an electronic message and not just delete it. In some cases, an opened electronic message contains a link to a resource that the sender of the electronic message wants the recipient to view. In response to the recipient clicking the link, a recipient is presented with the resource, for example a web site that provides the recipient with the opportunity to purchase services or goods. Alternatively, the linked resource provides an opportunity to register a purchase or subscribe to an ongoing service or an ongoing delivery of goods. When the recipient of the electronic message performs all the steps desired by the sender (e.g., completing a purchase), the electronic message is considered successfully converted.

Embodiments of the present invention recognize that not all recipients of an electronic message react to the message uniformly. Further recognized is that electronic messages contain visual content that may be modified. Such visual content includes, for example, images, typeface, stationary design, text color, punctuation, background color, an importance level, or a combination thereof.

Embodiments of the present invention provide an ability to selectively modify the content (e.g., visual content) of an electronic message for various groups of recipients depending on recipient profile data or aggregate data. Embodiments of the present invention provide an ability to determine the success (e.g., conversion rate) of an electronic message based on the one or more modifications used. Embodiments of the present invention provide an ability to build or add to a database that is used to improve the success of future electronic messages. Further provided is that different versions of the same electronic message may yield a higher conversion rate from one population of recipients relative to another population of recipients. Such versions may vary based, for example, on modifications of the conversational tone (i.e., the wording content), formatting (e.g., fonts or typeface content), or an importance level assigned to the electronic message.

As used herein, electronic messages include any electronic means of communicating through text, images, or a combination thereof. Examples of electronic messages include, but are not intended to be limited to: emails, text messages, social network electronic communications, short message service (SMS) messages, etc.

The present invention will now be described in detail with reference to the Figures.

Figure 1:
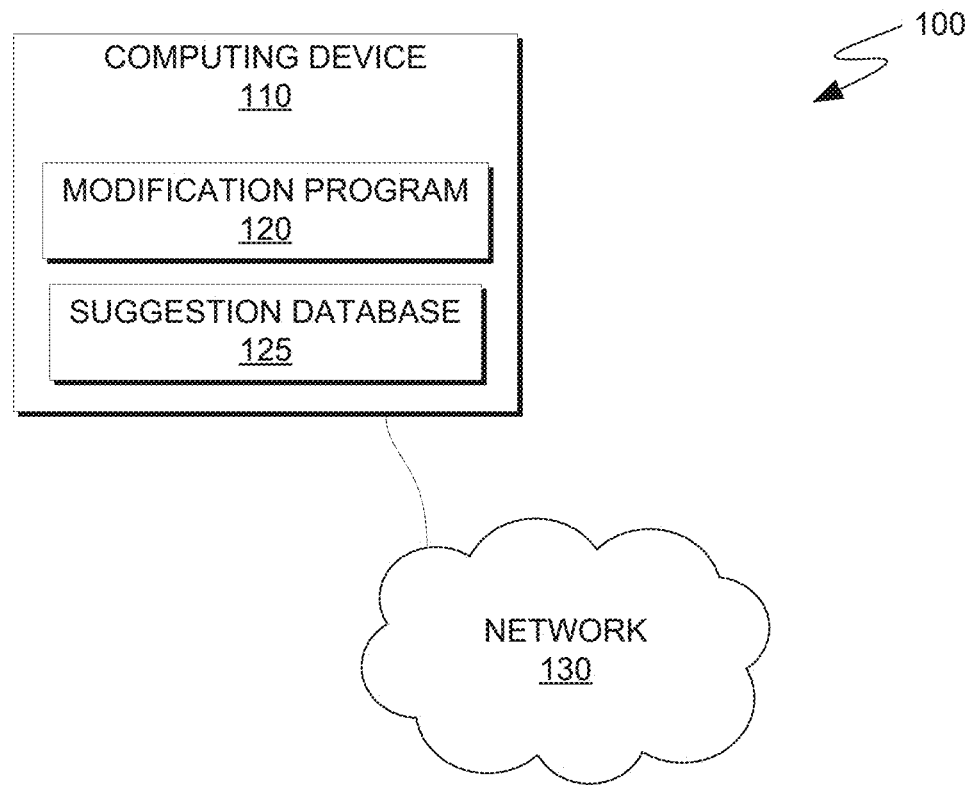
FIG. 1 is a functional block diagram illustrating an electronic message analysis and modification environment, in accordance with an embodiment of the present invention.

FIG. 1 is a functional block diagram illustrating an electronic message analysis and modification environment, generally designated 100, in accordance with one embodiment of the present invention. Electronic message analysis and modification environment 100 includes computing device 110 connected over network 130. Computing device 110 includes modification program 120 and suggestion database 125.

In this embodiment, computing device 110 is a computing device that can be a standalone device, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to suggestion database 125 and is capable of executing modification program 120. Computing device 110 may include internal and external hardware components, as depicted and described in further detail with respect to FIG. 9.

In this embodiment, modification program 120 and suggestion database 125 are stored on computing device 110. However, in other embodiments, modification program 120 and suggestion database 125 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 110, modification program 120, and suggestion database 125, in accordance with a desired embodiment of the present invention.

In various embodiments, modification program 120 analyzes an electronic message and suggests modifications of the electronic message based on data contained in suggestion database 125. For example, modification program 120 suggests synonyms for select words contained both in the electronic message and suggestion database 125, in response to determining that substituting the synonyms for the words will affect the conversational tone of the electronic message. The suggestions are based, at least in part, on group data for one or more recipients of the electronic message. Such group data is contained within suggestion database 125. In various examples, group data contained in suggestion database 125 indicates one or more rates at which members of the group perform certain actions after receiving an electronic message, such as an open rate (i.e., opening the electronic message), a click rate (i.e., clicking a link within the electronic message, and a conversion rate (i.e., converting the solicitation into a successful outcome, such as a purchase, registration, subscription, etc.). Each such rate corresponds to a content option, for example, a conversational tone or a typeface. For example, group data may indicate that electronic messages sent to recipients of the group that utilize a formal tone (relative to other conversational tones) yield a higher conversation rate. In this case, modification program 120 suggests the replacement of certain less formal words with more formal synonyms contained in suggestion database 125 for an electronic message addressed to one or more of the recipients of the group. In one embodiment, a group includes one or more recipients who share a population characteristic. The one or more recipients belong to the group with which they share a population characteristic.

In various embodiments, modification program 120 suggests alternative synonyms based, at least in part, on one or more recipient profiles contained within suggestion database 125. For example, suggestion database 125 contains recipient profile data indicating one or more recipients of an electronic message have demonstrated one or more of an improved open, click, or conversion rate when receiving past electronic messages that had a friendly conversational tone. Modification program 120 suggests the replacement of certain less friendly words with more friendly synonyms contained in suggestion database 125.

In various embodiments, modification program 120 suggests alternative formatting content based on recipient group data or recipient profile data contained within suggestion database 125. For example, group data within suggestion database 125 shows that one or more recipients of an electronic message are likely to output a better open, click, or conversion rate when receiving an electronic message that uses Helvetica typeface. Based on that group data, modification program 120 suggests the use of Helvetica typeface for the text of the electronic messages being sent to those one or more recipients. In another case, one or more recipient profiles within suggestion database 125 indicates that double-spaced text (as opposed to, for example, single-spaced text) in an electronic message increases the open, click, or conversion response rate for the one or more recipients associated with the recipient profiles. Based on that profile data, modification program 120 suggests the use of double spaced text for electronic messages being sent to those one or more recipients.

In various embodiments, modification program 120 suggests alternative image content based on recipient group data or recipient profile data contained within suggestion database 125. For example, group data within suggestion database 125 shows that one or more recipients of an electronic message are likely to output a better open, click, or conversion rate when receiving an electronic message that has a skyline image in the header. Based on that group data, modification program 120 suggests the use of a skyline header for the header of the electronic messages being sent to those one or more recipients. In another case, one or more recipient profiles within suggestion database 125 indicate that a cloverleaf stationary design in an electronic message increases the open, click, or conversion response rate for the one or more recipients associated with the recipient profiles. Based on that profile data, modification program 120 suggests the use of a cloverleaf stationary design for electronic messages being sent to those one or more recipients.

In various embodiments, modification program 120 suggests alternative color content based on recipient group data or recipient profile data contained within suggestion database 125. For example, group data within suggestion database 125 shows that one or more recipients of an electronic message are likely to output a better open, click, or conversion rate when receiving an electronic message that has blue colored text. Based on that group data, modification program 120 suggests the use of blue colored text for the electronic messages being sent to those one or more recipients. In another case, one or more recipient profiles within suggestion database 125 indicates that a tan background in an electronic message increases the open, click, or conversion response rate for the one or more recipients associated with the recipient profiles. Based on that profile data, modification program 120 suggests the use of a tan background for electronic messages being sent to those one or more recipients.

In various embodiments, modification program 120 suggests alternative punctuation content based on recipient group data or recipient profile data contained within suggestion database 125. For example, group data within suggestion database 125 shows that one or more recipients of an electronic message are likely to output a better open, click, or conversion rate when receiving an electronic message that has one or more exclamation points instead of periods. Based on that group data, modification program 120 suggests the use of one or more exclamation points instead of periods. In another case, one or more recipient profiles within suggestion database 125 indicates that a minimum of exclamation points in an electronic message increases the open, click, or conversion response rate for the one or more recipients associated with the individual profiles. Based on that profile data, modification program 120 suggests the minimum use of exclamation points for electronic messages being sent to those one or more recipients.

In various embodiments, modification program 120 suggests alternative message importance content based on recipient group data or recipient profile data contained within suggestion database 125. For example, group data within suggestion database 125 shows that one or more recipients of an electronic message are likely to output a better open, click, or conversion rate when receiving an electronic message that is marked important. Based on that group data, modification program 120 suggests that the electronic messages being sent to those one or more recipients be marked important. In another case, one or more recipient profiles within suggestion database 125 indicates that an electronic message marked as important decreases the open, click, or conversion response rate for the one or more recipients associated with the recipient profiles. Based on that profile data, modification program 120 suggests not to mark electronic messages being sent to those one or more recipients as important.

In various embodiments, modification program 120 suggests alternative times to send the electronic message based on recipient group data or recipient profile data contained within suggestion database 125. For example, group data within suggestion database 125 shows that one or more recipients of an electronic message are likely to output a better open, click, or conversion rate when receiving an electronic message between four o'clock and eight o'clock in the morning. Based on that group data, modification program 120 suggests that the electronic messages being sent to those one or more recipients be sent between four o'clock and eight o'clock in the morning. In another case, one or more recipient profiles within suggestion database 125 indicates that sending an electronic message between 8 o'clock PM and midnight increases the open, click, or conversion response rate for the one or more recipients associated with the recipient profiles. Based on that profile data, modification program 120 suggests sending an electronic message to those one or more recipients between 8 o'clock PM and midnight.

In various embodiments, modification program 120 allows electronic message content to two or more recipients to be different based on recipient group data or recipient profile data contained within suggestion database 125. In other words, modification program 120 allows the sender of the electronic message to create more than one version of the electronic message, each version being modified for individual recipients of the electronic message. For example, modification program 120 analyzes the content of an electronic message addressed to multiple users. Modification program 120 also analyzes one or both of group and recipient profiles of the multiple users. Modification program 120 determines that a first subset of the multiple users output a better open, click, or conversion rate for messages having a first conversational tone and a second subset of the multiple users provide a better open, click, or conversion rate for messages having a second conversational tone. Modification program 120 allows the sender to create a first version of the electronic message for the first subset of the multiple users wherein certain words can be replaced with words from suggestion database 125 corresponding to the first conversational tone. Modification program 120 allows the sender to also create a second version of the electronic message for the second subset of the multiple users wherein certain words can be replaced with words from suggestion database 125 corresponding to the second conversational tone.

In other embodiments, modification program 120 can send two or more versions of an electronic message at different times, the times of sending leading to a likely increase in the open, click, or conversion rate relative to other times of sending. Thus, the two or more versions of an electronic message will be sent to each individual recipient at a time that increases one or more of the open, click, or conversion rate for each recipient.

Figure 2:
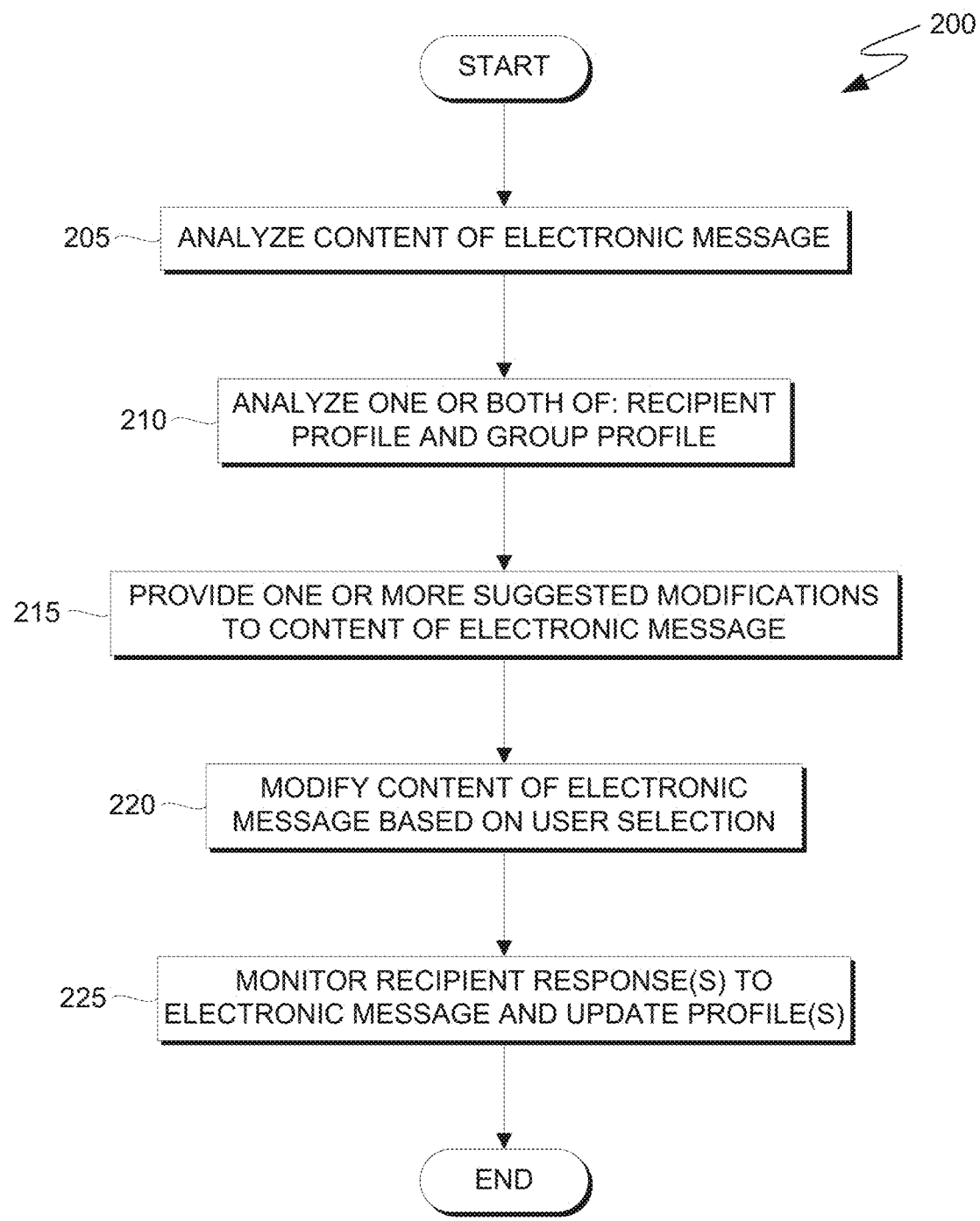
FIG. 2 illustrates operational processes of a modification program, on a computing device within the environment of FIG. 1, in accordance with an embodiment of the present invention.

FIG. 2 illustrates operational processes 200 of modification program 120, on computing device 110 within the environment of FIG. 1, in accordance with an embodiment of the present invention.

In step 205, modification program 120 analyzes the content of an electronic message. In various embodiments, the content includes one or more of: wording content, punctuation content, image content, color content, formatting content, and message importance content. In one embodiment, modification program 120 searches for words in the electronic message that match words in a synonym group table (see, e.g., FIG. 3 and accompanying discussion), which is a table in suggestion database 125 that specifies one or more synonym groups. A synonym group is a list of two or more synonyms that can replace each other in a sentence to give various desired conversational tones. The synonym group table in suggestion database 125 contains groups of words that are synonyms of each other and these words are each characterized by the conversational tone they provide when used in a sentence. If modification program 120 finds a match between a word in the electronic message and a word in the synonym group table, modification program 120 flags the synonym group and groups the synonyms in the synonym group by conversational tone. In various embodiments, modification program 120 also flags punctuation, images, color content such as font color or background color, formatting content such as font type, font size, line spacing, or other formatting, and message importance content. Modification program 120 logs the details of this content for comparison against group and recipient profile data in suggestion database 125.

In step 210, modification program 120 analyzes one or both of recipient profile data and group data contained on suggestion database 125 for each of the one or more recipients in the electronic message. This analysis provides an estimate of the preferences of the one or more electronic message recipients regarding a preferred electronic message content. In one embodiment, one or both of the individual and group data includes the percentage of: past electronic messages that have been opened (open rate), links within those emails that were clicked on (click rate), and successful transactions achieved (conversion rate). The open, click, and conversion rates are grouped by content type in order to ascertain which content type was most successful. For example, open, click, and conversion rates are grouped individually by text color preference (black, blue, green, red, etc.). Alternatively, open, click, and conversion rates are grouped individually by a conversational tone preference (formal, informal, jokey, literal, friendly, etc.). In another example, open, click, and conversion rates are grouped individually by time or time range for sending the electronic message. One skilled in the art would recognize that many other content types for grouping open, click, and conversion rates are possible and within the scope of embodiments of the current invention.

In one embodiment, the most successful content type is the content type that has caused the highest open rate in the past. In one embodiment, the most successful content type is the content type that has caused the highest click rate in the past. In one embodiment, the most successful content type is the content type that has caused the highest conversion rate in the past. In other embodiments, a combination of two or more of open, click, and conversion rates determines what the most successful content type is. For example, in one embodiment the open, click, and conversion rates are averaged for each individual content type and the content type with the highest average is suggested by modification program 120 as the most successful content type.

In various embodiments, modification program 120 averages more than one recipient profile together and logs the averages by conversational tone to create groups based on one or more common characteristics of the individuals in the recipient profiles. In one embodiment, a group can be generated by modification program 120 by individually averaging the open, click, and conversion rate of more than one recipient profile based on a known age range of the individuals in the recipient profiles. In another embodiment, a group can be generated by modification program 120 by individually averaging the open, click, and conversion rate of more than one recipient profile sharing a population characteristic. In various embodiments, population characteristics may include background information, personal statistics, descriptors, demographic information, or any combination thereof. In one embodiment, these profiles are used to generate suggestions of content for electronic message recipients when recipient profile data is unknown. In another embodiment, group data and a recipient profile are combined by averaging, weighted or not, to generate suggested content for the individual in the recipient profile.

In step 215, modification program 120 provides one or more suggested modifications based on one or both the content of the electronic message and the one or both recipient individual and groups in suggestion database 125. In one embodiment, modification program 120 suggests various conversation tone options. In another embodiment, modification program 120 suggests various text color options. In one embodiment, modification program 120 suggests various background color options. In another embodiment, modification program 120 suggests various image options. In one embodiment, modification program 120 suggests various punctuation options. In another embodiment, modification program 120 suggests various message importance options. In one embodiment, modification program 120 suggests various time of sending options. In another embodiment, modification program 120 suggests various formatting options.

In step 220, modification program 120 modifies the electronic message based on one or more user-selected suggested modifications. In various embodiments, the changes executed by modification program 120 include the formation of one or more modified versions of the original electronic message. For example, modification program 120 modifies content of an electronic message that results in one version having a jokey conversational tone, one version having a friendly conversational tone, and one version having a formal conversational tone. The three different versions will be sent to electronic message recipients that are anticipated to respond favorably to a jokey, friendly, or formal conversational tone, respectively. Other examples include multiple versions of an electronic message with one or more variations in background color, text color, punctuation, message importance, formatting, and images.

In step 225, modification program 120 monitors recipient responses to the electronic message. For example, modification program 120 detects that a recipient opens the electronic message, based on which modification program 120 updates one or both of the recipient profile data of the recipient and the group data for the group with which the recipient shares a population characteristic. The opening of the electronic message will increase the opening rate for the content types that were used for that electronic message. If the email is not opened, then the opening rate will decrease for the content types that were used for that electronic message. In one embodiment, an electronic message that is not opened by the recipient results in a decrease in click rate as well as conversion rate because the recipient neither clicked on one or more links within the electronic message nor engaged in the one or more transactions intended by the sender. In another embodiment, an electronic message that is not opened results in no change in click rate or conversion rate because the recipient never looked at the content that can only be viewed by opening the electronic message.

In another example, modification program 120 detects that the recipient clicks on one or more links within an opened electronic message, based on which modification program 120 updates one or both of the recipient profile of the recipient and the group data of a group with which the recipient shares a population characteristic. In one embodiment, clicking on any one of the one or more links will count as one hundred percent click rate for that message and will result in an increase in click rate for that recipient for the chosen electronic message content (provided said click rate is not one hundred percent). In another embodiment, clicking only on a percentage of the one or more links will increase the click rate for that recipient for the chosen electronic message content only if said click rate is lower than the percentage of links opened. If the percentage of links opened is lower than the click rate for that recipient for the chosen electronic message content, then the click rate will be decreased. In one embodiment, a link that is not opened by the recipient results in a decrease in conversion rate because the recipient did not engage in the one or more transactions intended by the sender. In another embodiment, a link that is not opened results in no change in conversion rate because the recipient never looked at the content that can only be viewed by opening the link.

In another example, modification program 120 determines that the recipient engages in one or more transactions intended by the sender, based on which modification program 120 updates one or both of the recipient profile of the recipient and the group data of a group with which the recipient shares a population characteristic. In one embodiment, engaging in any one of the one or more transactions will count as one hundred percent conversion rate for that message and will result in an increase in conversion rate for that recipient for the chosen electronic message content (provided said conversion rate is not one hundred percent). In another embodiment, engaging in only a percentage of the one or more transactions will increase the click rate for that recipient for the chosen electronic message content only if said conversion rate is lower than the percentage of transactions completed. If the percentage of transactions completed is lower than the conversion rate for that recipient for the chosen electronic message content, then the conversion rate will be decreased.

FIG. 3 is a portion of a table illustrating the characterization of synonym groups by conversational tones, in accordance with an embodiment of the present invention. Synonym groups 1 and 2 in FIG. 3 are a list of words characterized as belonging in one or more of the conversational tones formal, informal, friendly, direct, and jokey. For example, the word "protest" in synonym group 1 is characterized as a word that gives a sentence either a formal or direct conversational tone. The synonym "quibble" in synonym group 1 is characterized as a word that would give a sentence an informal, friendly, or jokey conversational tone. For synonym group 2, the word "workers" is characterized as a word that gives a sentence a formal conversational tone. The synonym "liveware" in synonym group 2 is characterized as a word that would give a sentence an informal, friendly, or jokey conversational tone. Thus, if an electronic message were being sent to a first recipient who tended to exhibit better open, click, and conversion rates when a friendly conversational tone was used, modification program 120 would suggest a sentence such as: "The liveware quibbled when they had to work overtime." However, if an electronic message were being sent to a second recipient who tended to exhibit better open, click, and conversion rates when a formal conversational tone was used, modification program 120 would suggest a sentence such as: "The workers protested when they had to work overtime."

In various embodiments, modification program 120 offers all possible synonyms within a synonym group for the electronic message sender to consider. Thus, depending on the sender choice of available synonyms in synonym groups 1 and 2, the first recipient might receive the previously mentioned electronic message with the sentence: "The hired hands beefed when they had to work overtime." Alternatively, depending on the sender choice, the second recipient might receive the previously mentioned electronic message with the sentence: "The employees objected when they had to work overtime." In various embodiments, modification program 120 contains an algorithm that provides the synonym in the proper form (e.g., proper tense, conjugation, or plurality) for incorporation into a sentence.

Figure 4:
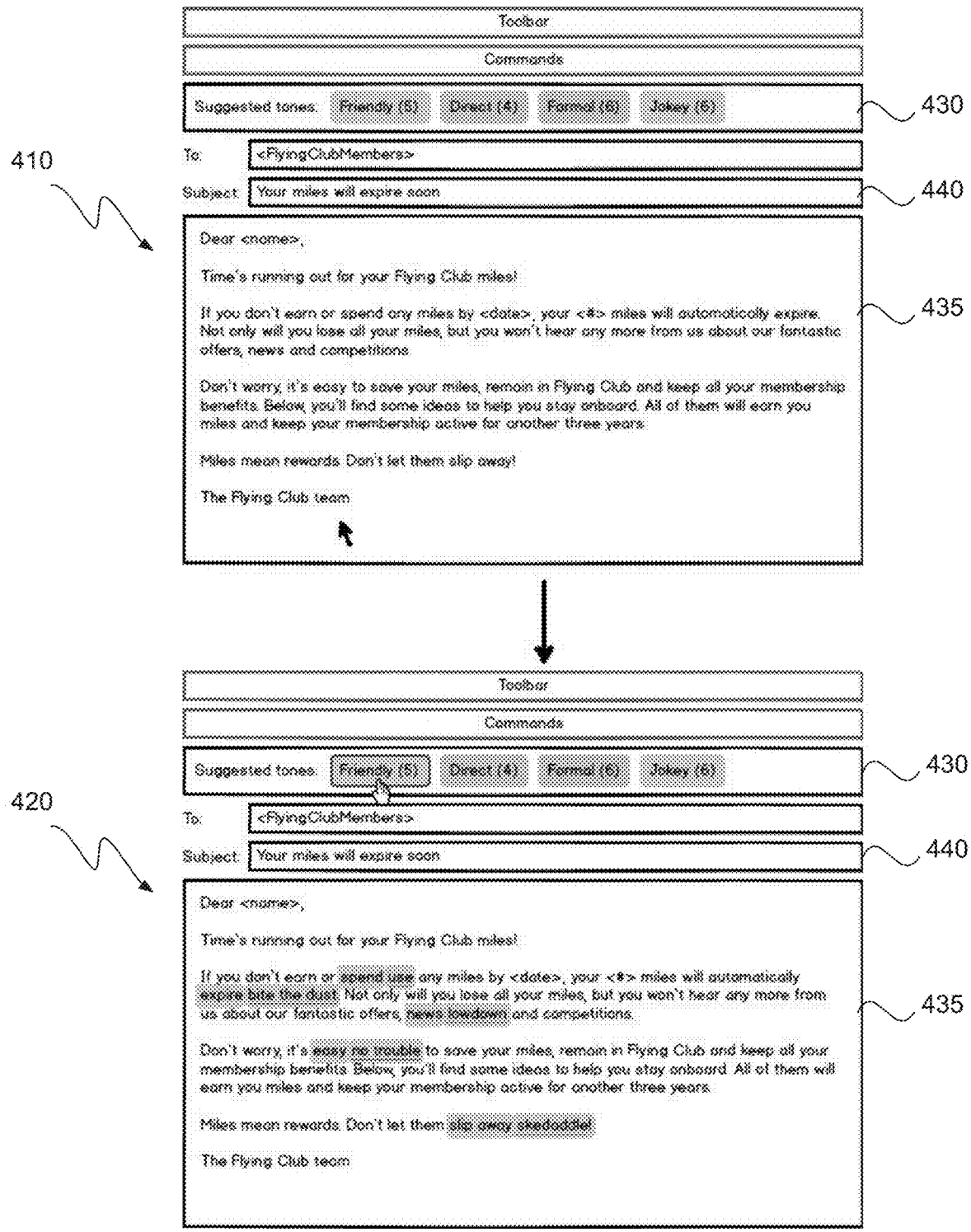
FIG. 4 is a first part of an example showing the modification program offering synonym choices in order to modulate the conversational tone of an electronic message, in accordance with an embodiment of the present invention.

FIG. 4 is a first part of an example showing modification program 120 suggesting synonym choices in order to modify the conversational tone of an electronic message, in accordance with an embodiment of the present invention. Message instance 410 shows a message addressed to members of a flying club ("To: <FlyingClubMembers>"). The members of the flying club contain four subsets of individuals with recipient profiles or groups that indicate a better open, click, and conversion rates when either a friendly, direct, formal, or jokey conversational tone is used. In other words, within the membership of the flying club there is a group that responds positively to friendly messages, a group that responds positively to direct messages, a group that responds positively to formal messages, and a group that responds positively to jokey messages. Thus, modification program 120 offers those four suggested conversational tones in suggested tones box 430. In this embodiment, the numbers in parentheses to the right of the conversational tones indicates the number of words within the message that can be changed to provide that conversational tone.

In message instance 420, the electronic message sender selects the friendly suggestion tone in suggested tones box 430. Modification program 120 highlights five words within the electronic message that are not characterized as having a friendly conversation tone, but can be changed to a synonym that is characterized as having a friendly conversation tone. In the message instance 420 example, the original word that can be replaced is highlighted without an underline and the synonym that can replace that word is highlighted, underlined, and immediately to the right of the original word that can be replaced. It should be appreciated that this example provides only an illustration of one implementation and does not imply any limitations with regard to the environments in which different embodiments may be implemented. For example, another embodiment includes the use of color-coded highlighting to indicate which word was used originally in the message and which words are suggested to be replacement synonyms. Yet another embodiment includes modification program 120 suggesting the replacement of words outside of the electronic message body 435. For example, in one embodiment, the words in subject box 440 that can be replaced with a suggested synonym, such as the word "expire," are highlighted and a replacement synonym is suggested.

Figure 5:
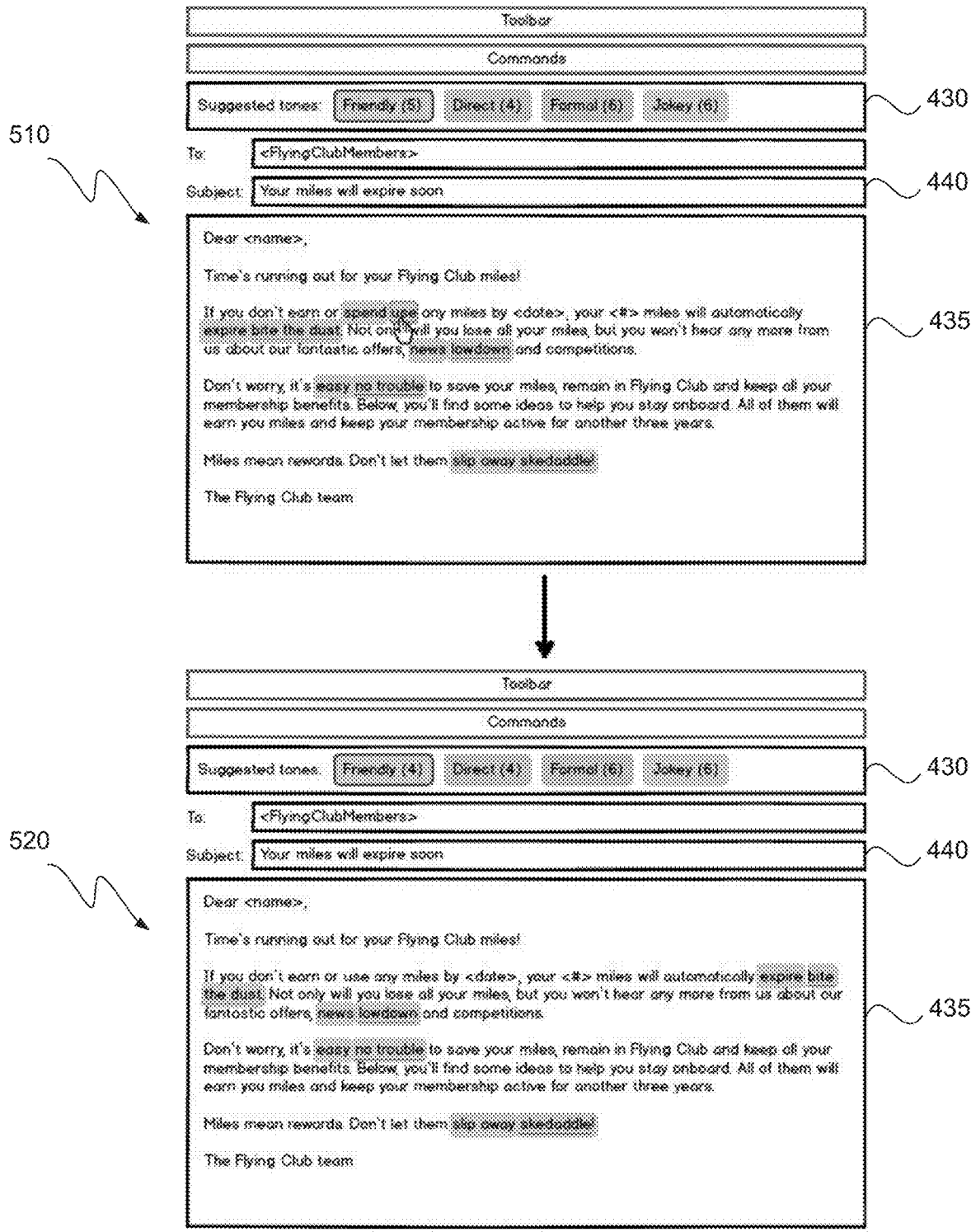
FIG. 5 is a second part of the example showing the modification program offering synonym choices in order to modulate the conversational tone of an electronic message, in accordance with an embodiment of the present invention.

FIG. 5 is a second part of an example showing modification program 120 suggesting synonym choices in order to modify the conversational tone of an electronic message, in accordance with an embodiment of the present invention. In message instance 510, the electronic message sender selects a first suggested synonym that provides a friendly conversation tone in electronic message body 530. In this embodiment, the selection of the first (or any) suggested synonym causes modification program 120 to generate message instance 520, wherein the original word and its highlighting are deleted and replaced with the suggested synonym without its highlighting. The number in parentheses next to the friendly suggested tone tab in suggested tones box 430 is lowered by one reflecting the number of remaining words in message instance 520 that can still be modified by a synonym with a conversation tone characterized as friendly.

The sender of the shown electronic message in FIGS. 4 and 5 may continue to make modifications as described thereby creating a final friendly conversational tone message version of the original electronic message. The final friendly conversational tone message version can then be sent to recipients in "<FlyingClubMembers>" identified by modification program 120 as recipients more likely to exhibit a higher open, click, and conversion rate for an electronic message having a friendly conversational tone as compared to other conversational tones. In this example, the sender of the shown electronic message in FIGS. 4 and 5 may also continue to create additional versions of the electronic message using analogous steps (e.g., direct, formal, and jokey versions).

FIG. 6A is a table of example data acquired by modification program 120 that shows the effect of conversational tones on electronic message success rates for a first audience segment, in accordance with an embodiment of the present invention. In this present example, "Audience Segment 1" refers to either an individual recipient or a representation of more than one recipients (e.g., an average). The percentages listed for open, click, and conversion rate reflect the percentage of electronic messages opened, links clicked, and transactions successfully completed, respectively, for the recipient(s) represented by the data within the table. Based on the listed percentages, direct and formal electronic messages have the best open, click, and conversion rate for the recipient(s) represented by the table in FIG. 6A. In this table, a preference for direct vs. formal electronic messages is indistinguishable. Thus, in one embodiment, modification program 120 preferentially suggests synonyms that are listed in suggestion database 125 for both direct and formal conversational tones. In another embodiment, modification program 120 offers the combination of all synonyms that are characterized as formal or direct from which the sender can select. Audience Segment 1 and Audience Segment 2 do not necessarily represent the same one or more recipients in each of FIGS. 6A-8B.

FIG. 6B is a table of example data acquired by modification program 120 that shows the effect of conversational tones on electronic message success rates for a second audience segment, in accordance with an embodiment of the present invention. In this present example, "Audience Segment 2" refers to either an individual recipient or a representation of more than one recipients (e.g., an average). The percentages listed for open, click, and conversion rate reflect the percentage of electronic messages opened, links clicked, and transactions successfully completed, respectively, for the recipient(s) represented by the data within the table. Based on the listed percentages, literal electronic messages have the best open, click, and conversion rate for the recipient(s) represented by the table in FIG. 6A. In this example, all three metrics: open, click, and conversion rate are predicted by modification program 120 to be highest if a literal conversational tone is employed. Thus modification program 120 suggests a literal conversational tone for the recipient(s) of this message.

FIG. 7A is a table of example data acquired by modification program 120 that shows the effect of select formatting (e.g., typeface or font) on electronic message success rates for a first audience segment, in accordance with an embodiment of the present invention. In this present example, "Audience Segment 1" refers to either an individual recipient or a representation of more than one recipients (e.g., an average). The percentages listed for open, click, and conversion rate reflect the percentage of electronic messages opened, links clicked, and transactions successfully completed, respectively, for the recipient(s) represented by the data within the table. In this instant example, use of the Calibri typeface or font produces the highest historical open, click, and conversion rate amongst the recipient(s) included in this group. In one embodiment, modification program 120 suggests using the Calibri typeface or font because it has the highest rate for all three rates. In another embodiment, modification program 120 does statistical analysis to determine the font or typeface to be used. For example, if the percentage of opened emails that were taken through the link clicking stage are analyzed, then the Calibri typeface or font had a 33% success rate in "Audience Segment 1" (10%/30%*100=33%). However, under that same analysis, the Palatino typeface or font had 44% success rate for the same recipient(s) (8%/18%*100=44%). Thus, depending on the statistical analysis desired, modification program 120 suggests electronic message font or typeface modifications (e.g., Calibri, Palatino, or another) using statistical parameters that are readily modulated by the electronic message sender.

FIG. 7B is a table of example data acquired by modification program 120 that shows the effect of select formatting (e.g., typeface or font) on electronic message success rates for a second audience segment, in accordance with an embodiment of the present invention. In this present example, "Audience Segment 2" refers to either an individual recipient or a representation of more than one recipients (e.g., an average). The percentages listed for open, click, and conversion rate reflect the percentage of electronic messages opened, links clicked, and transactions successfully completed, respectively, for the recipient(s) represented by the data within the table. In this instant example, use of the Arial typeface or font produces the highest historical open, click, and conversion rate amongst the recipient(s) included in this group. In one embodiment, modification program 120 suggests using the Arial typeface or font because it has the highest rate for all three rates. In another embodiment, modification program 120 does statistical analysis to determine the font or typeface to be used. For example, if the percentage of opened emails that were taken through the link clicking stage are analyzed, then the Arial typeface or font had a 31% success rate in "Audience Segment 2" (8%/26%*100=31%). However, under that same analysis, the Bookman typeface or font had 40% success rate for the same recipient(s) (4%/10%*100=40%). Thus, depending on the statistical analysis desired, modification program 120 suggests electronic message font or typeface modifications (e.g., Arial, Bookman, or another) using statistical parameters that are readily modulated by the electronic message sender.

FIG. 8A is a table of example data acquired by modification program 120 that shows the effect of send time on electronic message success rates for a first audience segment, in accordance with an embodiment of the present invention. In this present example, "Audience Segment 1" refers to either an individual recipient or a representation of more than one recipients (e.g., an average). The percentages listed for open, click, and conversion rate reflect the percentage of electronic messages opened, links clicked, and transactions successfully completed, respectively, for the recipient(s) represented by the data within the table. In this instant example, sending the electronic message between 4:01 AM and 8 AM produces the highest historical open and conversion rate amongst the recipient(s) included in this group. However, the highest click rate (9%) occurs when the electronic message is sent between 4:01 PM and 8 PM. In one embodiment, modification program 120 suggests to send or automatically sends the electronic message between 4:01 AM and 8 AM because the recipient(s) open rate and conversion rate are highest for electronic messages sent during that time window. In another embodiment, modification program 120 suggests to send or automatically sends the electronic message between 4:01 PM and 8 PM because the recipient(s) click rate is highest for electronic messages sent during that time window.

FIG. 8B is a table of example data acquired by modification program 120 that shows the effect of send time on electronic message success rates for a second audience segment, in accordance with an embodiment of the present invention. In this present example, "Audience Segment 2" refers to either an individual recipient or a representation of more than one recipients (e.g., an average). The percentages listed for open, click, and conversion rate reflect the percentage of electronic messages opened, links clicked, and transactions successfully completed, respectively, for the recipient(s) represented by the data within the table. In this instant example, sending the electronic message between 12:01 PM and 4 PM produces the highest historical open, click, and conversion rate amongst the recipient(s) included in this group. Thus, modification program 120 suggests to send or automatically sends the electronic message between 12:01 PM and 4 PM.

Figure 9:
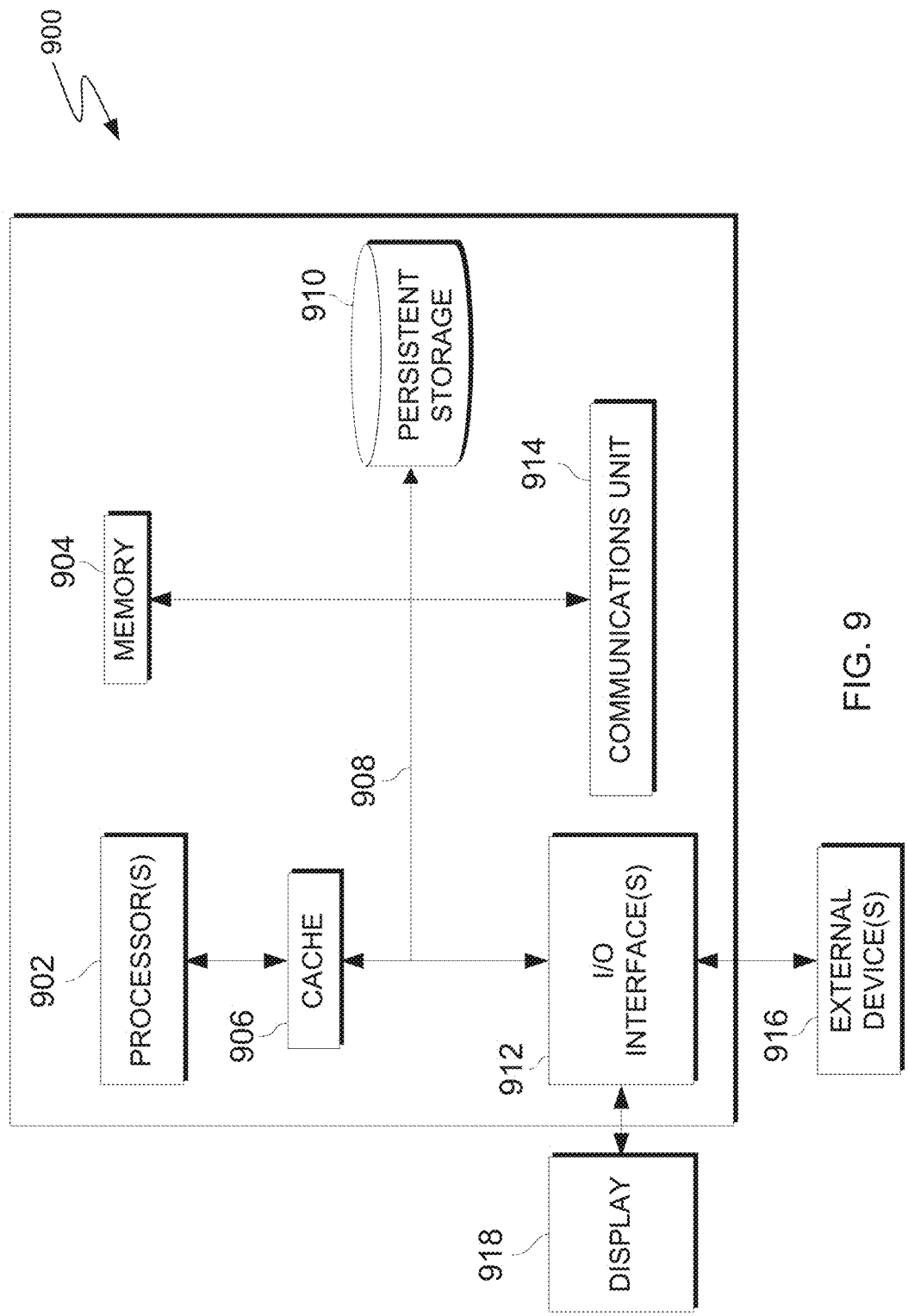
FIG. 9 depicts a block diagram of components of the computing device executing the modification program, in accordance with an embodiment of the present invention.

FIG. 9 is a block diagram of components of a computing device, generally designated 900, in accordance with an embodiment of the present invention. In one embodiment, computing system 900 is representative of computing device 110 within electronic message analysis and modification environment 100, in which case computing device 110 includes modification program 120 and suggestion database 125.

It should be appreciated that FIG. 9 provides only an illustration of one implementation and does not imply any limitations with regard to the environments in which different embodiments may be implemented. Many modifications to the depicted environment may be made.

Computing system 900 includes processor(s) 902, cache 906, memory 904, persistent storage 910, input/output (I/O) interface(s) 912, communications unit 914, and communications fabric 908. Communications fabric 908 provides communications between cache 906, memory 904, persistent storage 910, communications unit 914, and input/output (I/O) interface(s) 912. Communications fabric 908 can be implemented with any architecture designed for passing data and/or control information between processors (such as microprocessors, communications and network processors, etc.), system memory, peripheral devices, and any other hardware components within a system. For example, communications fabric 908 can be implemented with one or more buses or a crossbar switch.

Memory 904 and persistent storage 910 are computer readable storage media. In this embodiment, memory 904 includes random access memory (RAM). In general, memory 904 can include any suitable volatile or non-volatile computer readable storage media. Cache 906 is a fast memory that enhances the performance of processor(s) 902 by holding recently accessed data, and data near recently accessed data, from memory 904.

Program instructions and data used to practice embodiments of the present invention may be stored in persistent storage 910 and in memory 904 for execution by one or more of the respective processor(s) 902 via cache 906. In an embodiment, persistent storage 910 includes a magnetic hard disk drive. Alternatively, or in addition to a magnetic hard disk drive, persistent storage 910 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 910 may also be removable. For example, a removable hard drive may be used for persistent storage 910. Other examples include optical and magnetic disks, thumb drives, and smart cards that are inserted into a drive for transfer onto another computer readable storage medium that is also part of persistent storage 910.

Communications unit 914, in these examples, provides for communications with other data processing systems or devices. In these examples, communications unit 914 includes one or more network interface cards. Communications unit 914 may provide communications through the use of either or both physical and wireless communications links. Program instructions and data used to practice embodiments of the present invention may be downloaded to persistent storage 910 through communications unit 914.

I/O interface(s) 912 allows for input and output of data with other devices that may be connected to each computer system. For example, I/O interface(s) 912 may provide a connection to external device(s) 916 such as a keyboard, keypad, a touch screen, and/or some other suitable input device. External device(s) 916 can also include portable computer readable storage media such as, for example, thumb drives, portable optical or magnetic disks, and memory cards. Software and data used to practice embodiments of the present invention can be stored on such portable computer readable storage media and can be loaded onto persistent storage 910 via I/O interface(s) 912. I/O interface(s) 912 also connect to display 918.

Display 918 provides a mechanism to display or present data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as "Smalltalk" and the like may be subject to trademark rights in various jurisdictions throughout the world and are used here only in reference to the products or services properly denominated by the marks to the extent that such trademark rights may exist.

What is claimed is:

1. A computer program product comprising:
one or more computer-readable storage media and program instructions stored on at least one of the one or more computer-readable storage media, the program instructions comprising:
program instructions to analyze a content of an electronic message having one or more recipients for words present in a database of synonyms;
program instructions to provide one or more suggested synonym modifications to the content of the electronic message based, at least in part, on:
i) a conversational tone of the electronic message that will be imparted by the one or more suggested synonym modifications; and
ii) on at least one of: recipient profile data of the one or more recipients and group data of the one or more recipients,
wherein the one or more suggested synonym modifications to the content of the electronic message is selected from a group consisting of a conversation tone option, a text color option, a background color option, an image content option, a punctuation content option, a message importance option, a time of sending option, and a formatting option;
program instructions to modify the content of the electronic message based, at least in part, on a selected suggested synonym modification of the one or more suggested synonym modifications in response to receiving an interaction of a user, wherein the interaction of the user identifies the selected suggested synonym modification;
program instructions to receive one or more responses of the one or more recipients of the electronic message; and
program instructions to determine a click rate, wherein the click rate includes clicking a link within the electronic message.

2. The computer program product of claim 1, wherein the program instructions stored on the at least one of the one or more computer-readable storage media further comprise:
program instructions to determine at least one of: an open rate and a conversion rate, based, at least in part, on the one or more responses.

3. The computer program product of claim 1, wherein the program instructions stored on the at least one of the one or more computer-readable storage media further comprise:
program instructions to modify at least one of: the recipient profile data of the one or more recipients and the group data of the one or more recipients, based, at least in part, on the one or more responses.

4. The computer program product of claim 1, wherein individual words of the electronic message are substituted with synonyms that contain a different conversational tone, intended for a specific recipient or group of recipients, based on one or more of an open rate, a click rate, and a conversion rate.

5. The computer program product of claim 1, wherein each of the one or more suggested synonym modifications corresponds to a recipient of the one or more recipients.

6. The computer program product of claim 1, further comprising:
modifying the content of the electronic message that results in one version having a jokey conversational tone, a second version having a friendly conversational tone, and a third version having a formal conversational tone; and
sending the three different versions to electronic message recipients that are anticipated to respond favorably to a jokey, friendly, or formal conversational tone, respectively.

7. The computer program product of claim 6, wherein the program instructions stored on the at least one of the one or more computer-readable storage media further comprise:
program instructions to send the electronic message to each of the one or more recipients, wherein the content of the electronic message is modified for each recipient based on each of the suggested synonym modifications corresponding to the recipient.

8. A computer system comprising:
one or more computer processors;
one or more computer-readable storage media; and
program instructions stored on at least one of the one or more computer-readable storage media for execution by at least one of the one or more processors, the program instructions comprising:
program instructions to analyze a content of an electronic message having one or more recipients for words present in a database of synonyms;
program instructions to provide one or more suggested synonym modifications to the content of the electronic message based, at least in part, on:
i) a conversational tone of the electronic message that will be imparted by the one or more suggested synonym modifications; and
ii) on at least one of: recipient profile data of the one or more recipients and group data of the one or more recipients,
wherein the one or more suggested synonym modifications to the content of the electronic message is selected from a group consisting of a conversation tone option, a text color option, a background color option, an image content option, a punctuation content option, a message importance option, a time of sending option, and a formatting option;
program instructions to modify the content of the electronic message based, at least in part, on a selected suggested synonym modification of the one or more suggested synonym modifications in response to receiving an interaction of a user, wherein the interaction of the user identifies the selected suggested synonym modification;
program instructions to receive one or more responses of the one or more recipients of the electronic message; and
program instructions to determine a click rate, wherein the click rate includes clicking a link within the electronic message.

9. The computer system of claim 8, wherein the program instructions stored on the at least one of the one or more computer-readable storage media further comprise:
program instructions to determine at least one of: an open rate and a conversion rate, based, at least in part, on the one or more responses.

10. The computer system of claim 8, wherein the program instructions stored on the at least one of the one or more computer-readable storage media further comprise:
program instructions to modify at least one of: the recipient profile data of the one or more recipients and the group data of the one or more recipients, based, at least in part, on the one or more responses.

11. The computer system of claim 8, wherein individual words of the electronic message are substituted with synonyms that contain a different conversational tone, intended for a specific recipient or group of recipients, based on one or more of an open rate, a click rate, and a conversion rate.

12. The computer system of claim 8, wherein each of the one or more suggested synonym modifications corresponds to a recipient of the one or more recipients.

13. The computer system of claim 8, further comprising:
  modifying the content of the electronic message that results in one version having a jokey conversational tone, a second version having a friendly conversational tone, and a third version having a formal conversational tone; and
  sending the three different versions to electronic message recipients that are anticipated to respond favorably to a jokey, friendly, or formal conversational tone, respectively.

* * * * *